US009552214B2

(12) United States Patent
Stern et al.

(10) Patent No.: US 9,552,214 B2
(45) Date of Patent: Jan. 24, 2017

(54) TOOL FOR AUTOMATED EXTRACTION AND LOADING OF CONFIGURATION SETTINGS

(75) Inventors: Daniel Scott Stern, Denver, CO (US); Manuel Albert Neyra, Highlands Ranch, CO (US); Yu-feng Gu, Aurora, CO (US); Tom Williams, Lone Tree, CO (US); Shawn Martine, Denver, CO (US); Jason Reicheneker, Highlands Ranch, CO (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 1427 days.

(21) Appl. No.: 11/380,254

(22) Filed: Apr. 26, 2006

(65) Prior Publication Data
US 2007/0256056 A1 Nov. 1, 2007

(51) Int. Cl.
*G06F 9/445* (2006.01)
*G06F 17/30* (2006.01)

(52) U.S. Cl.
CPC ............ *G06F 9/44505* (2013.01); *G06F 8/63* (2013.01); *G06F 17/303* (2013.01); *G06F 17/30575* (2013.01)

(58) Field of Classification Search
CPC ................ G06F 8/36; G06F 8/60–8/68; G06F 17/30088; G06F 17/303; G06F 17/30569; G06F 17/30575–17/30584
See application file for complete search history.

(56) References Cited

U.S. PATENT DOCUMENTS

| 6,240,428 | B1 * | 5/2001 | Yeung et al. |
| 6,256,773 | B1 * | 7/2001 | Bowman-Amuah ......... 717/121 |
| 6,606,744 | B1 | 8/2003 | Mikurak |
| 6,738,756 | B1 * | 5/2004 | Brown et al. |
| 6,741,997 | B1 * | 5/2004 | Liu et al. |
| 6,836,657 | B2 | 12/2004 | Ji et al. |
| 7,024,412 | B1 * | 4/2006 | Webb et al. .................. 707/615 |

(Continued)

OTHER PUBLICATIONS

Oracle, "Exporting and Importing Content", 2004 [retrieved Apr. 5, 2012], Retrieved from Internet: <http://web.archive.org/web/20040430144945/http://portalcenter.oracle.com/pls/ops/docs/FOLDER/COMMUNITY/DOCTEAM/DOCINSTCONF/9026_CG_IMEX.PDF>, pp. 10-1-10-52.*

(Continued)

*Primary Examiner* — Todd Aguilera
(74) *Attorney, Agent, or Firm* — Kilpatrick Townsend & Stockton LLP (57) ABSTRACT

Systems, methods, and machine-readable media are disclosed for automating setup of configuration data for an application program. In one embodiment, a method of automating setup of configuration data for an application program can comprise identifying a set of configuration data used by a first instance of the application program. The set of configuration data can contain data for substantially replicating a configuration for the first instance of the application program. The method can further include extracting the set of configuration data from the first instance of the application program. A manifest can be created identifying data in the set of configuration data. The set of configuration data can be saved in a portable format that includes the set of configuration data and the manifest.

27 Claims, 8 Drawing Sheets

(56) References Cited

U.S. PATENT DOCUMENTS

| | | | |
|---|---|---|---|
| 7,191,435 B2 | 3/2007 | Lau et al. | |
| 7,206,828 B1 | 4/2007 | Bourke-Dunphy et al. | |
| 7,346,627 B2* | 3/2008 | Ramanathan et al. | 707/616 |
| 7,607,126 B2* | 10/2009 | Read | 717/172 |
| 7,836,458 B1 | 11/2010 | Gwozdz et al. | |
| 7,865,707 B2* | 1/2011 | Bittlingmayer et al. | 713/1 |
| 7,873,684 B2* | 1/2011 | Souder et al. | 707/825 |
| 8,464,244 B2 | 6/2013 | Stern et al. | |
| 8,726,272 B2 | 5/2014 | Williams et al. | |
| 2004/0128644 A1* | 7/2004 | Hurst et al. | 717/100 |
| 2005/0010919 A1* | 1/2005 | Ramanathan et al. | 717/174 |
| 2005/0038831 A1* | 2/2005 | Souder et al. | 707/201 |
| 2005/0055351 A1* | 3/2005 | Barton et al. | 707/10 |
| 2005/0068558 A1 | 3/2005 | Wang et al. | |
| 2005/0138558 A1* | 6/2005 | Duevel et al. | 715/700 |
| 2005/0188367 A1 | 8/2005 | Oberholtzer | |
| 2005/0262499 A1* | 11/2005 | Read | 717/172 |
| 2006/0015839 A1* | 1/2006 | Owens et al. | 717/100 |
| 2007/0061803 A1 | 3/2007 | Barrett | |
| 2007/0157170 A1 | 7/2007 | Reiss et al. | |
| 2007/0220248 A1* | 9/2007 | Bittlingmayer et al. | 713/100 |
| 2007/0240152 A1 | 10/2007 | Li et al. | |
| 2008/0209413 A1 | 8/2008 | Kakumani et al. | |
| 2008/0243589 A1 | 10/2008 | Lim et al. | |
| 2008/0271008 A1 | 10/2008 | Dettori et al. | |
| 2009/0083728 A1 | 3/2009 | Dennis et al. | |
| 2009/0178034 A1 | 7/2009 | Stern et al. | |
| 2010/0180270 A1 | 7/2010 | Williams et al. | |

OTHER PUBLICATIONS

Lubbers, P., et al., Oracle9iAS Portal Configuration Guide, 2002 [retrieved Apr. 5, 2012], Retrieved from Internet: http://web.archive.org/web/20040430150926/http://portalcenter.oracle.com/pls/ops/docs/FOLDER/COMMUNITY/CONFIGHTML/A90852_0.PDF>, pp. i-Index-4.*

Gemmick, J., et al., Oracle SQLLoader: The Definitive Guide, O'Reilly & Associates [online], 2001 [retrieved Feb. 3, 2014], Retrived from Internet: <URL: http://kva.es/Database_EBooks/O/OReilly.Oracle.sqlloader.pdf>, pp. xi, 1-46.*

*Oracle® Ietup 11i data sheet*, (iSetup Migrator Key Features) and (iSetup Reporter Key Features), Oracle Corporation, 500 Oracle Parkway, Redwood Shores, CA 94065, Sep. 2004, 3 pages.

Manoj Gupta, *Oracle® iSetup User Guide*, Release 11i, Part No. B10695-02, Oracle Corporation, 500 Oracle Parkway, Redwood Shores, CA 94065, Sep. 2004, 136 pages.

*What is Oracle iSetup?* and *Key Product Benefits*, file://C:\Documents and and Setting\sbm\Local Setting\Temp\Apps Migrator.htm, Jul. 20, 2006, 2 pages.

*About Oracle iSetup Mini-pack 11 i.Az.F*, file://C:\Documents and Setting\sbm\Local Settings\Temp\About Oracle iSetup Mini pac. . . , Jul. 20, 2006, 8 pages.

Gupta, M., "Oracle iSetup User Guide," Release 11i.9, part No. B10695-01, Jun. 2003, Oracle Corporation, 500 Oracle Parkway, Redwood Shores, CA, 156 pages.

Serbedzija, N., et al., "E-QUEST: A Simple Solution for E-Questionnaires," IADIS International Conference e-Society, 2004, pp. 425-432.

U.S. Appl. No. 11/970,833. filed Jan. 8, 2008, Office Action dated Sep. 19, 2011, 9 pages.

U.S. Appl. No. 11/970,833, filed Jan. 8, 2008 by Daniel Scott Stern et al., Final Office Action dated Mar. 1, 2012, 9 pages.

U.S. Appl. No. 12/354,057, filed Jan. 8, 2008 by Thomas R. Williams et al., Office Action dated Apr. 4, 2012, 27 pages.

Oracle9i Database Migration Chapter 5 Compatibility and Interoperability, Oracle (Published 2002) retrieved from http://docs.oracle.com/cd/B1 0501_01 /server.920/a96530/migcompa.htm on Mar. 29, 2013.

U.S. Appl. No. 11/970,833, Notice of Allowance, mailed Feb. 14, 2013, 7 pages.

U.S. Appl. No. 12/354,057, Final Office Action, mailed Sep. 12, 2012, 36 pages.

U.S. Appl. No. 12/354,057, Final Office Action, mailed Apr. 12, 2013, 40 pages.

U.S. Appl. No. 12/354,057, Non-Final Office Action, mailed Dec. 20, 2012, 34 pages.

U.S. Appl. No. 12/354,057, Non-Final Office Action, mailed Jul. 18, 2013, 41 pages.

U.S. Appl. No. 12/354,057, filed Jan. 8, 2008 by Thomas R. Williams et al., Advisory Action dated Jun. 28, 2013, 3 pages.

U.S. Appl. No. 12/354,057, filed Jan. 8, 2008 by Thomas R. Williams et al., Non-Final Office Action dated Jul. 18, 2013, 41 pages.

U.S. Appl. No. 12/354,057, filed Jan. 8, 2008 by Thomas R. Williams et al., Notice of Allowance dated Dec. 19, 2013, 35 pages.

* cited by examiner

TOOL FOR AUTOMATED EXTRACTION AND LOADING OF CONFIGURATION SETTINGS

BACKGROUND OF THE INVENTION

Embodiments of the present invention relate generally to configuring application programs and more particularly to automating setup of configuration data for an application program.

Companies using packaged enterprise software or other large-scale applications to run their businesses typically have implementation teams that configure their software before they use it. Many implementations share common configuration settings. For example, companies may have to incorporate legal requirements in their business practices, or they may have similar or identical processes due to their industry, size, or other factors.

There are several ways an implementation project team may configure an instance of a software package to meet these requirements. When experienced, outside consultants are hired to help with configuration, they may have documentation, spreadsheets, or knowledge from prior implementations that are relevant to the new customer. If the customer implements without outside help, they may ask other companies, use documentation and examples, or create configuration through trial and error.

These methods for creating configuration typically rely on the past experience of the implementer, particularly in the case of hiring outside consultants. The implementer must remember, capture or document the relevant configuration settings, manually extracting those parameters which are useful for a new implementation and excluding those which are specific to the former customer. In addition, the consultant must remember, capture or document the complete set of configuration settings to repeat the configuration.

In addition, the capturing of configuration from a prior implementation is a manual process which requires knowledge of how configuration is represented in the application, how it can be extracted out and in what forms it can be loaded into a new instance. Some software packages have tools to load data from spreadsheets into the software instance. However, these specific capabilities are not comprehensive and do not enforce relationships or completeness. Configuration is typically held in multiple, heterogeneous constructs, and extraction requires knowledge of these constructs, how they can be accessed, extracted, persisted and loaded as well as the relationships and components which, taken as a whole, would provide a complete and coherent configuration set.

Current solutions require knowledge, outside of the software package, of the ways in which configuration is stored and accessed and the relationships between elements of configuration. The loading of configuration requires manual steps, using disparate technologies, and managing completeness across multiple tasks. This is a complex problem to solve, and manual, individual efforts are prone to errors and omissions. Hence, there is a need for methods and systems that allow for automating setup of configuration data for an application program.

BRIEF SUMMARY OF THE INVENTION

Systems, methods, and machine-readable media are disclosed for automating setup of configuration data for an application program. In one embodiment, a method of automating setup of configuration data for an application program, such as an enterprise solution or other large-scale application, can comprise identifying a set of configuration used by a first instance of the application program. The set of configuration data can contain data for substantially replicating a configuration from the first instance of the application program. In some cases, identifying a set of configuration data can comprise determining whether data used by the first instance of the application program comprises data predefined as configuration data. Additionally or alternatively, identifying a set of configuration data can comprise determining whether data used by the first instance of the application program has changed due to configuration activities in the application.

The set of configuration data can be extracted from the first instance of the application program. A manifest identifying data in the set of configuration data can be created and the set of configuration data can be saved in a portable format. In some cases, the method can further comprise, prior to extracting the set of configuration data, presenting a summary of the set of configuration data to a user. In such a case, a user selection of a subset of the set of configuration data can be received and extracting the set of configuration data, creating a manifest identifying the data in the set of configuration data, and saving the set of configuration data can include only the subset of the set of configuration data selected by the user. In other cases, the method can further comprise receiving a user selection of additional configuration data not represented in the set of configuration data. In such a case, extracting the set of configuration data, creating a manifest identifying the data in the set of configuration data, and saving the set of configuration data can include the additional configuration data selected by the user.

The portable format can include the set of configuration data and the manifest from the first instance of the application program. Saving the configuration data in a portable format can comprise saving the configuration data in a repository readable by a tool for loading the configuration data into a second instance of the application program and the manifest can comprise a file readable by the tool. For example, the repository can comprise a database while the manifest can comprise a set of values and attributes, for example in an eXtensible Markup Language (XML) file, defining the set of configuration data in the repository.

According to one embodiment, the method can further comprise reading the manifest extracted from the first instance of the application program, reading the set of configuration data from the first instance of the application program, and copying the set of configuration data to a second instance of the application program based on information in the manifest. In some cases, the method can include, prior to copying the set of configuration data, presenting a summary of the set of configuration data to a user. In such a case, the method can further comprise receiving a user selection of a subset of the set of configuration data and copying the set of configuration data to the second instance of the application program can include only the subset of the set of configuration data selected by the user.

According to yet another embodiment, a system for providing automated setup of configuration data can comprise a first environment having a first instance of a base application. An extractor can be communicatively coupled with the first instance of the base application and can be adapted to identify the set of configuration data. The set of configuration data can contain data for substantially replicating a configuration from the first instance of the application program. In some cases, the extractor can identify a set of configuration data by determining whether data from the first instance of the base application comprises data predefined as configuration data. Additionally or alternatively, the extractor can identify a set of configuration data by determining whether data from the first instance of the base application has changed due to configuration activities in the first instance of the application.

The extractor can extract the set of configuration data, create a manifest identifying data in the set of configuration data, and save the set of configuration data in a portable format. In some cases, the extractor can be further adapted to present a summary of the set of configuration data to a user prior to extracting the set of configuration data. In such a case, the extractor can be further adapted to receive a user selection of a subset of the set of configuration data and extract the set of configuration data, create a manifest identifying the data in the set of configuration data, and save the set of configuration data including only the subset of the set of configuration data selected by the user. In other cases, the extractor can be further adapted to receive a user selection of additional configuration data not represented in the set configuration data. In such a case, the extractor can extract the set of configuration data, create a manifest identifying the data in the set of configuration data, and save the set of configuration data including the additional configuration data selected by the user.

According to one embodiment, the portable format can include the set of configuration data and the manifest from the first instance of the base application. The extractor can save the configuration data in a portable format by saving the configuration data in a repository, such as a database, readable by a tool for loading the configuration data into a second instance of the base application. The manifest can comprise a file readable by the tool and may include, for example, a set of values and attributes defining the set of configuration data in the repository. In some cases, the manifest may comprise, for example, an eXtensible Markup Language (XML) file.

According to yet another embodiment, the system can further comprise a second environment, the second environment can comprise a second instance of the base application and a loader communicatively coupled with the second instance of the base application. The loader can be adapted to read the manifest from the first instance of the base application, read the set of configuration data from the first instance of the base application, and copy the set of configuration data to the second instance of the base application based on information in the manifest. In some cases, the loader can be further adapted to present a summary of the set of configuration data to a user prior to copying the set of configuration data. In such a case, the loader can be further adapted to receive a user selection of a subset of the set of configuration data and copy only the subset of the set of configuration data selected by the user to the second instance of the base application.

In some cases, the second environment can further comprise an extractor communicatively coupled with the second instance of the base application. In such a case, the extractor can be adapted to identify a set of configuration data of the second instance of the base application. The set of configuration data can contain data for substantially replicating a configuration from the second instance of the base application. The extractor can extract the set of configuration data from the second instance of the base application, create a manifest identifying data in the set of configuration data, and save the set of configuration data in a portable format. The portable format can include the set of configuration data and the manifest from the second instance of the base application.

In this way, embodiments of the present invention can provide configuration data to a series of environments and/or instances of a base application. As will be discussed below, the first instance can comprise, for example, a demonstration version of the base application and the second instance can comprise a full version of the base application. In another example, the first instance and second instance can comprise production versions of the base application or full versions of the base application. In still another example, the first instance can comprise a full version of the base application and the second instance can comprise a demonstration version of the base application. In yet another example, the first instance and the second instance can comprise demonstration versions of the base application. Other variations are contemplated and considered to be within the scope of the present invention.

DETAILED DESCRIPTION OF THE INVENTION

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form. Importantly, it should be noted that while described herein with reference to enterprise solutions, embodiments of the present invention should not be considered limited to use with enterprise solutions. For example, embodiments of the present invention are thought to be equally applicable to other types of application programs and may be especially useful with various large-scale applications.

Embodiments of the present invention provide methods, system and machine-readable media for automating setup of configuration data for an application program. Generally speaking, embodiments of the present invention provide a tool which automates the extraction and/or loading of configuration information. Various embodiments of the present invention can be used to take configuration information from one instance of a software application and move or copy that information to a new instance of the application. Accordingly, the configuration, once extracted, is portable and can be loaded into multiple, disparate new instances and/or environments.

Components utilized to affect the various embodiments can be aware of the constructs in the application that define configuration. Furthermore, these components can access, extract, persist and load information into and out of these constructs. Optionally, a user can be provided with a list of some or all of the configuration information being extracted or loaded. In such a case, the user can identify subsets of configuration settings to include in the extract, select additional information to include as configuration information, and/or define new configuration information. Likewise, the user can identify subsets of the configuration settings they want to load.

In this way, embodiments of the present invention provide for extracting complete configurations and also allow the user to define which elements of configurations they want to include. According to one embodiment, extraction can occur from a usable instance of the application so the configuration can be tested and extracted as a whole after validation. Furthermore, since the extractions more completely represent a configuration, users of the present invention need not rely on knowledge of multiple mechanisms to load manually extracted configuration elements. Embodiments of the present invention also allow selected, interrelated subsets of the configuration to be loaded into a new instance of the application. For example, a given implementation may use several modules in the packaged application, while excluding others. Furthermore, embodiments of the present invention allow the user to select the configuration settings relevant to the modules that will be implemented, and omit the loading of configuration settings for other modules.

According to one embodiment of the present invention and as will be discussed below, a set of configuration data can be extracted from an instance of a base application such as, for example, an enterprise solution. A manifest can be created identifying data in the set of configuration data. The set of configuration data can be saved in a portable format that includes the set of configuration data and the manifest. Saving the configuration data in a portable format can comprise saving the configuration data in a repository readable by the extractor and the manifest can comprise a file readable by the loader. For example, the repository can comprise a database while the manifest can comprise a set of values and attributes defining the set of configuration data in the repository. The manifest can, for example, comprise an eXtensible Markup Language (XML) file.

According to one embodiment, prior to extracting the set of configuration data, a summary of the set of configuration data can be presented to a user. A user selection of a subset of the set of configuration data can be received. In such a case, extracting the set of configuration data, creating a manifest identifying the data in the set of configuration data, and saving the set of configuration data can include only the subset of the set of configuration data selected by the user. Alternatively, a user selection of additional configuration data not represented in the set of configuration data can be received. In such a case, extracting the set of configuration data, creating a manifest identifying the data in the set of configuration data, and saving the set of configuration data can include the additional configuration data selected by the user.

According to another embodiment, loading the extracted configuration data into a second instance of the base application can include reading the manifest and the set of configuration data associated with this manifest, in portable format, and copying the set of configuration data to the second instance of the application program based on information in the manifest. In some cases, prior to copying the set of configuration data, a summary of the set of configuration data can be presented to a user. In such a case, a user selection of a subset of the set of configuration data can be received and copying the set of configuration data to the database used by the second instance of the application program can include only the subset of the set of configuration data selected by the user.

Importantly, it should be noted that embodiments of the present invention may be implemented in a wide variety of environments and on a wide variety of devices and/or systems. Therefore, the following exemplary environments and systems are offered for illustrative purposes only and should not be considered limiting on the wide variety of possible implementation of the various embodiments of the present invention.

Figure 1:
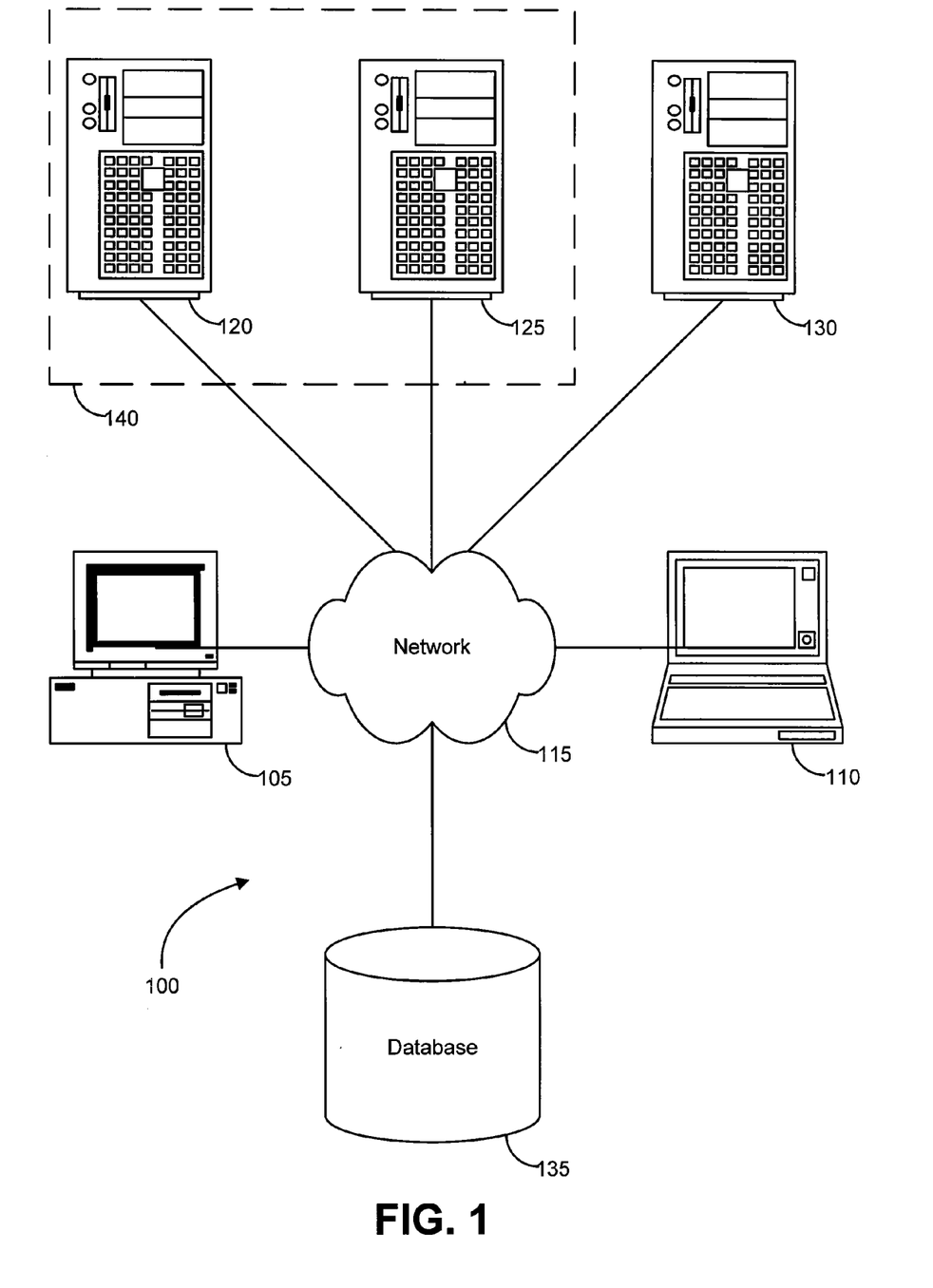
FIG. 1 is a block diagram illustrating components of an exemplary operating environment in which various embodiments of the present invention may be implemented.

FIG. 1 is a block diagram illustrating components of an exemplary operating environment in which various embodiments of the present invention may be implemented. The system 100 can include one or more user computers 105, 110, which may be used to operate a client, whether a dedicate application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may can be any type of network familiar to those skilled in the art that can support data communications using any of a variety of commercially-available protocols, including without limitation TCP/IP, SNA, IPX, AppleTalk, and the like. Merely by way of example, the network 115 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 140) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle, Microsoft, Sybase™, IBM™ and the like, which can process requests from database clients running on a user computer 105, 110.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10g, that is adapted to store, update, and retrieve data in response to SQL-formatted commands.

Figure 2:
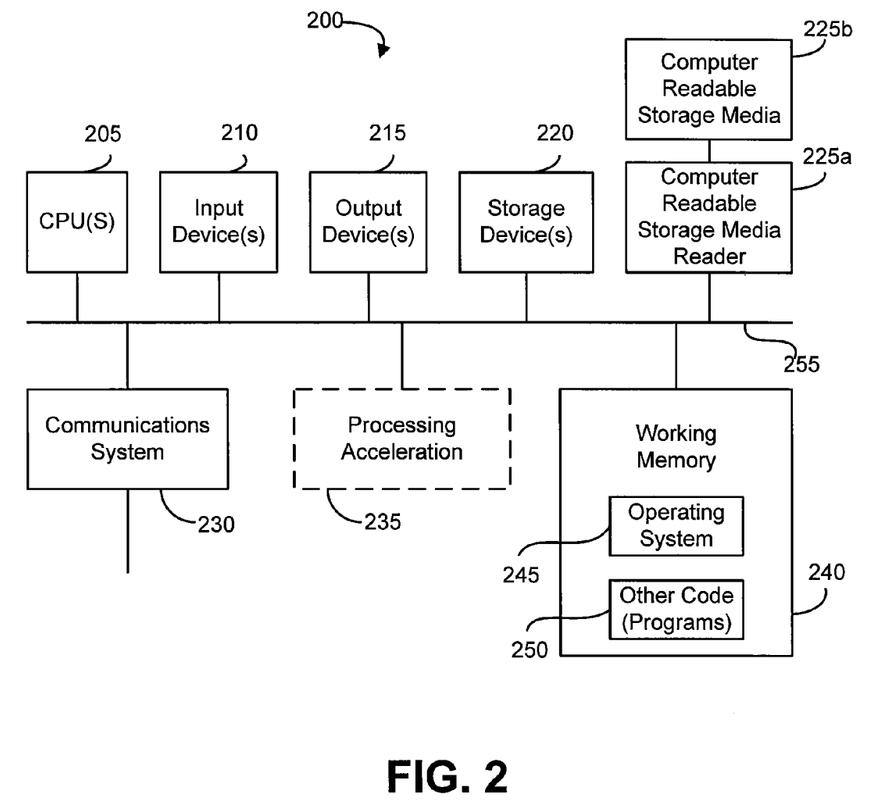
FIG. 2 is a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing processes for dynamically providing multimodal and/or multi-device configuration and support.

Figure 3:
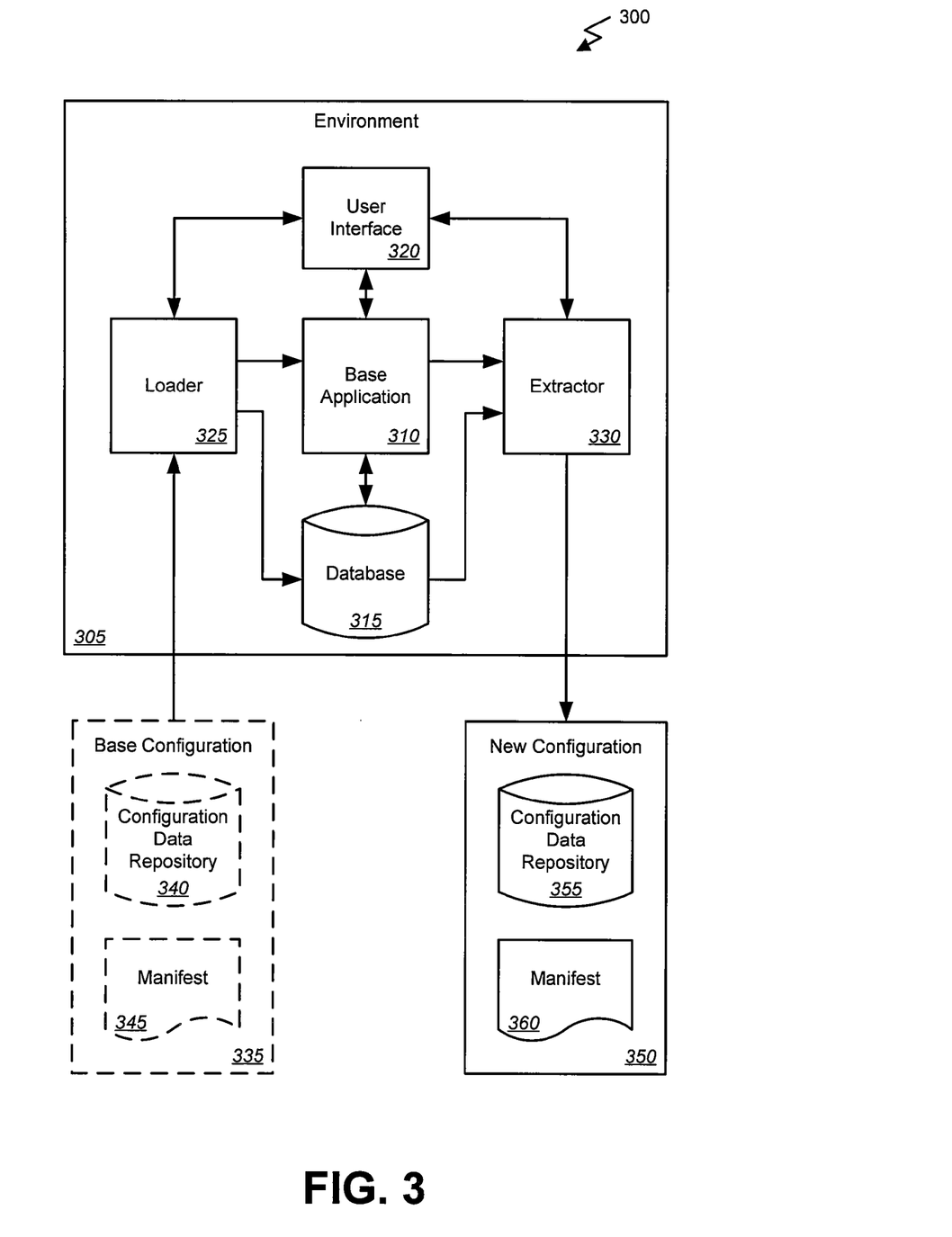
FIG. 3 is a block diagram illustrating functional components of a system for automated extraction and loading of configuration settings according to one embodiment of the present invention.

FIG. 3 is a block diagram illustrating functional components of a system for automated extraction and loading of configuration settings according to one embodiment of the present invention. In this example, the system 300 includes an operating environment 305 having a instance of a base application 310. The instance of the base application 310 can represent an installed version of any of a wide variety of possible commercial or proprietary software. For example, the base application 310 may be an enterprise solution such as Oracle E-Business Suite, JD Edwards EnterpriseOne, or another software package.

The base application 310 can be communicatively coupled with a database 315. The database 315 may be any of a variety of possible types as discussed above that may be suitable for use with or by the base application 310. The base application 310 can be adapted to read and write data in the database 315. This data can include both configuration data and other data used during the operation of the base application 310. Importantly, it should be noted that configuration data used by the base application 310 may additionally or alternatively be stored or otherwise located in other elements of the system 300. For example, configuration data may be stored in any type of repository other than a database, either within or outside of the application 310.

The operating environment 305 can also optionally include a user interface 320 for allowing one or more users to interact with, access, control, etc. the base application 310 and/or the data in the database 315. The user interface 320 may be any of a variety of possible graphical, textual, or other interfaces allowing the user to, for example, control execution of the base application 310, access information in the database 315, etc. According to one embodiment, the user interface 320 can also be used to set and/or modify configuration information used by the base application 310.

According to one embodiment of the present invention, an extractor 330 can also be communicatively coupled with the database 310 and/or the base application 310. The extractor 330 can be adapted to identify a set of configuration data saved in the database 315, in the application 310, or elsewhere in the system 300. The set of configuration data can contain data for substantially replicating a configuration for this instance of the base application 310. The extractor 330 can identify this configuration data in a number of different ways. For example, the extractor 330 can identify a set of configuration data by determining whether the data comprises data predefined as configuration data. That is, the extractor 330 may have a predetermined or pre-identified set of data, identified by name, address, table, etc., known to be configuration data to be extracted. In another example, the extractor 330 can identify a set of configuration data by determining whether the data from the database 315 has changed due to configuration activities since creation, i.e., installation, of the first instance of the base application 310. That is, the extractor 330 may track changes made by the base application 310 and, based on these changes, identify configuration data. In yet another example, the extractor 330 may additionally or alternatively use a predefined set of information that is known to be other than configuration data. That is, the extractor 330 may have a predetermined or pre-identified set of data, identified by name, address, table, etc., known to not be used for configuration by the base application 310.

Once the extractor 330 identifies the set of configuration data, the extractor 330 can create a manifest and extract the set of configuration data. The extractor 330 can save the set of configuration data in a new configuration 350 in a portable format that includes the set of configuration data 355 and the manifest 360. The extractor 330 can save the configuration data in a portable format by saving the configuration data in a repository 355 readable by a loader used to load configuration data to a second instance of the application (not shown here). Furthermore, the manifest 360 can comprise a file or other structure readable by the loader. So, for example, the repository 355 for storing the set of configuration data can comprise a database while the manifest 360 can comprise a set of values and attributes stored, for example, in an eXtensible Markup Language (XML) or other format file, defining the set of configuration data in the repository 355.

According to one embodiment, the extractor 330 can be further adapted to present a summary of the set of configuration data to the user, for example via user interface 320, prior to extracting the set of configuration data from the database 315, application 310 or elsewhere. That is, the extractor 330 can provide a list or other presentation of the data to be extracted as configuration data for the user to approve or modify. Therefore, the extractor 330 can be further adapted to receive a user selection of a subset of the set of configuration data. In such a case, the extractor 330 extracts the set of configuration data, creates a manifest identifying the data in the set of configuration data, and saves the set of configuration data including only the subset of the set of configuration data selected by the user. Additionally or alternatively, the extractor 330 can be further adapted to receive a user selection of additional configuration data represented in the set configuration data. That is, the user may be able to select additional information, not identified by the extractor 330, to be included in the extracted configuration data. In such a case, the extractor 330 extracts the set of configuration data, creates a manifest identifying the data in the set of configuration data, and saves the set of configuration data including the additional configuration data selected by the user.

In addition or as an alternative to entering configuration information via a user interface 320, configuration data for the base application 310 may also be loaded via loader 325 communicatively coupled with the database 315 and/or application 310 from an optional base configuration 335. That is, a base configuration 335, including a repository 340 of configuration data and a manifest 345, can be extracted from another environment (not shown here) as discussed above and provided to set up the configuration of this environment 305. In this way, the configuration of the other environment can be imported in whole or in part.

The loader 325 can be adapted to read the manifest 345 and the set of configuration data from the repository 340 of the base configuration 335 and copy the set of configuration data to the database 315, base application 310, or elsewhere based on information in the manifest 345. According to one embodiment, the loader 325 can be further adapted to present a summary of the set of configuration data to a user, for example via user interface 320, prior to copying the set of configuration data. That is, the user may be allowed to select which configuration data from the base configuration 335 to be loaded. In such a case, the loader 325 can be further adapted to receive a user selection of a subset of the set of configuration data and copy only the subset of the set of configuration data selected by the user.

Therefore, incorporating the extractor 325 and loader 330 allows for configuration data to be ported from one environment, system, application instance, etc. to another, customized and further ported to another environment, system, application instance, etc. However, it should be appreciated that a number of minor or even significant variations are possible without departing from the scope of the present invention. For example, a manifest can be shared by itself as a guide to creating or extracting configuration. Also, portable extractions, with manifests, can be posted to a website or otherwise made available to potential users (consultants, customers, etc). Manifest can include questions or other information to identify subsets (chunks) of configuration data, either in one portable extraction or in multiple, and how they relate, allowing the user to choose to load one or more chunks to create their configuration.

Figure 4:
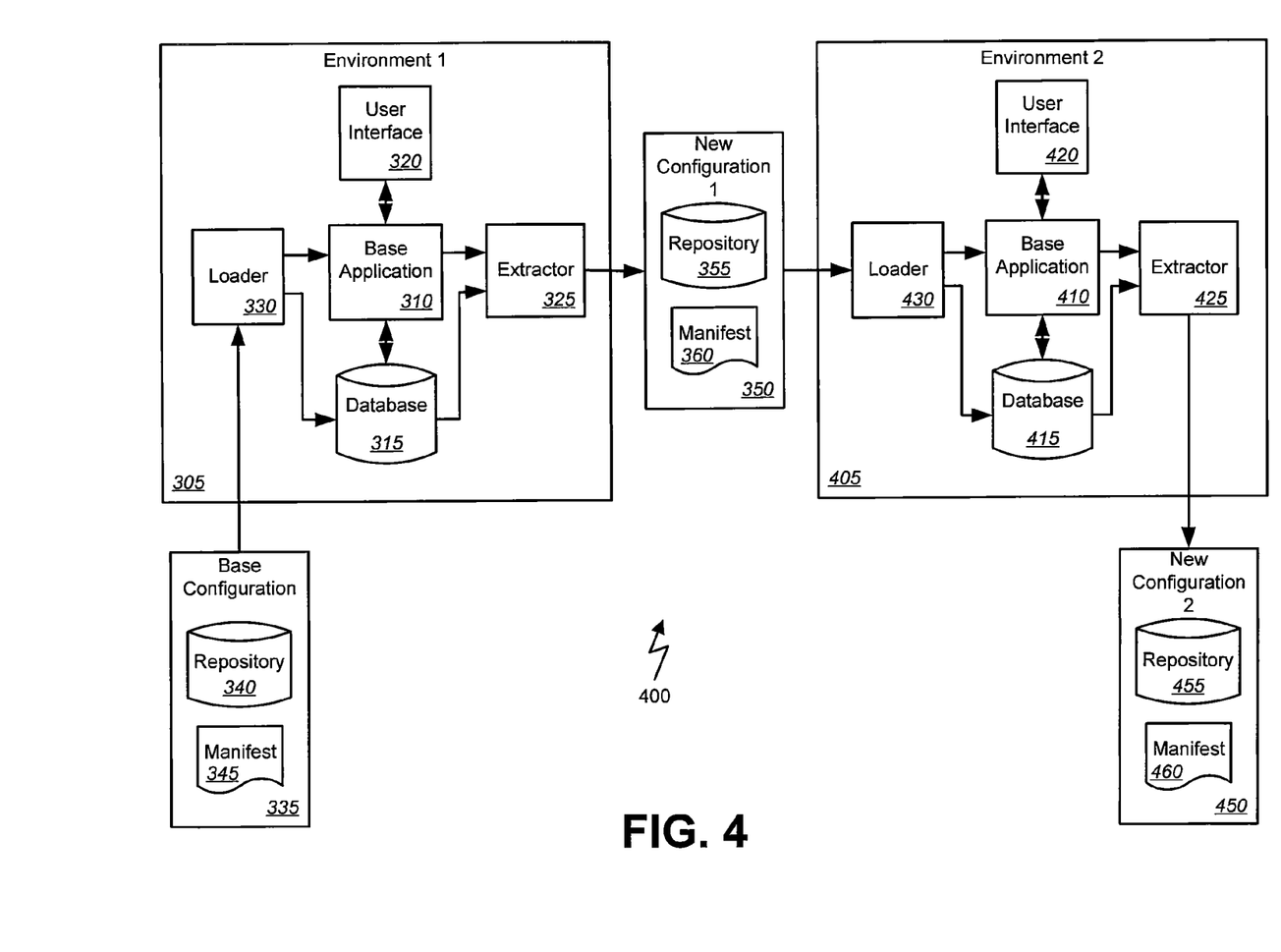
FIG. 4 is a block diagram illustrating a sequence of multiple loading, customization, and extraction of configuration settings according to one embodiment of the present invention.

FIG. 4 is a block diagram illustrating a sequence of multiple loading, customization, and extraction of configuration settings according to one embodiment of the present invention. In this example, representing another variation of the previous embodiment, the system 400 includes a first operating environment 305 and a second operating environment 405. As in the previous example, the first operating environment includes an instance of a base application 310. The first instance of the base application 310 can represent an installed version of any of a wide variety of possible commercial or proprietary software.

The first instance of the base application 310 can be communicatively coupled with a database 315 of the first environment 305. The database 315 may be any of a variety of possible types as discussed above that may be suitable for use with or by the first instance of the base application 310. The first instance of the base application 310 can be adapted to read and write data in the database 310. This data can include both configuration data and other data used during the operation of the first instance of the base application 310. As noted above, configuration data used by the base application 310 may additionally or alternatively be stored or otherwise located in other elements of the system 300.

The first environment 305 can also include a user interface 320 for allowing one or more users to interact with, access, control, etc. the base application 310 and the data in the database 315. The user interface may be any of a variety of possible graphical, textual, or other interfaces allowing the user to, for example, control execution of the base application 310, access information in the database 315, etc. According to one embodiment, the user interface 320 can also be used to set and/or modify configuration information used by the base application 310.

In addition or as an alternative to entering configuration information via a user interface 320, configuration data may also be loaded into the first environment 305 via loader 325 communicatively coupled with the database 315 and/or application 310 from a base configuration 335. That is, a base configuration 335, including a repository 340 of configuration data and a manifest 345, can be extracted from another environment (not shown here) as discussed above and provided to set up the configuration of this environment 305. In this way, the configuration of the other environment can be imported in whole or in part.

The loader 325 can be adapted to read the manifest 345 and the set of configuration data from the repository 340 of the base configuration 335 and copy the set of configuration data to the database 315, base application 310, or elsewhere based on information in the manifest 345. According to one embodiment, the loader 325 can be further adapted to present a summary of the set of configuration data to a user, for example via user interface 320, prior to copying the set of configuration data. In such a case, the loader 325 can be further adapted to receive a user selection of a subset of the set of configuration data and copy only the subset of the set of configuration data selected by the user.

According to one embodiment of the present invention, the first environment can also include an extractor 330 communicatively coupled with the database 315 and/or base application 310. The extractor 330 can be adapted to identify a set of configuration data saved in the database 315, base application 310 or elsewhere. The set of configuration data can contain data for substantially replicating a configuration from this first instance of the base application 310. The extractor 330 can identify this configuration data in a number of different ways. For example, the extractor 330 can identify a set of configuration data by determining whether the data comprises data predefined as configuration data. That is, the extractor 330 may have a predetermined or pre-identified set of data, identified by name, address, table, etc., known to be configuration data to be extracted. In another example, the extractor 330 can identify a set of configuration data by determining whether the data has changed due to configuration activity since creation or installation of the first instance of the base application 310. That is, the extractor 330 may track changes made by the base application 310 and, based on these changes, identify configuration data. In yet another example, the extractor 330 may additionally or alternatively use a predefined set of information that is known to be other than configuration data. That is, the extractor 330 may have a predetermined or pre-identified set of data, identified by name, address, table, etc., known to not be used for configuration by the base application 310.

Once the extractor 330 identifies the set of configuration data, the extractor 330 can extract the set of configuration data and create a manifest identifying data in the set of configuration data. The extractor 330 can save the set of configuration data in a first new configuration 350 in a portable format that includes the set of configuration data 355 and the manifest 360. The extractor 330 can save the configuration data in a portable format by saving the configuration data in a repository 355 readable by the loader of a second instance of the base application. Furthermore, the manifest can comprise a file readable by the loader. So, for example, the repository 355 for storing the set of configuration data can comprise a database while the manifest 360 can comprise a set of values and attributes stored, for example in an eXtensible Markup Language (XML) or other format file, defining the set of configuration data in the repository 355.

According to one embodiment, the extractor 330 can be further adapted to present a summary of the set of configuration data to the user, for example via user interface 320, prior to extracting the set of configuration data. That is, the extractor 330 can provide a list or other presentation of the data to be extracted as configuration data for the user to approve or modify. Therefore, the extractor 330 can be further adapted to receive a user selection of a subset of the set of configuration data. In such a case, the extractor 330 extracts the set of configuration data, creates a manifest identifying the data in the set of configuration data, and saves the set of configuration data including only the subset of the set of configuration data selected by the user in the first new configuration 350. Additionally or alternatively, the extractor 330 can be further adapted to receive a user selection of additional configuration data not represented in the set configuration data. In such a case, the extractor 330 extracts the set of configuration data, creates a manifest identifying the data in the set of configuration data, and saves the set of configuration data including the additional configuration data selected by the user in the first new configuration 350.

In the example illustrated in FIG. 4, the system 400 includes a second environment 405 having a second instance of the base application 410. The second instance of the base application 410 can be communicatively coupled with a database 415 of the second environment 405. The database 415 may be any of a variety of possible types as discussed above that may be suitable for use with or by the base application 410. The second instance of the base application 410 can be adapted to read and write data in the database 410. This data can include both configuration data and other data used during the operation of the second instance of the base application 410.

The operating environment 405 can also include a user interface 420 for allowing one or more users to interact with, access, control, etc. the base application 410 and the data in the database 415. The user interface may be any of a variety of possible graphical, textual, or other interfaces allowing the user to, for example, control execution of the base application 410, access information in the database 415, etc. According to one embodiment, the user interface 420 can also be used to set and/or modify configuration information stored in the database 415, the second instance of the base application 410, or elsewhere.

Similar to the first environment 305, configuration data may also be loaded into the second environment 405 via a loader 430 communicatively coupled with the database 415 and/or the second instance of the base application 410. In this case, the configuration data can be loaded from the first new configuration 350 from the first environment 305. That is, the first new configuration 350, including the repository 355 of configuration data and a manifest 360, extracted from the first environment 305 as discussed above can be used to set up the configuration of the second environment 405. In this way, the configuration of the first environment 305 can be imported in whole or in part to the second environment 405.

The loader 430 can be adapted to read the manifest 360 and the set of configuration data from the repository 355 of the first new configuration 350 and copy the set of configuration data to the database 415, the second instance of the base application 410, or elsewhere based on information in the manifest 445. According to one embodiment, the loader 430 can be further adapted to present a summary of the set of configuration data to a user, for example via user interface 420, prior to copying the set of configuration data. In such a case, the loader 430 can be further adapted to receive a user selection of a subset of the set of configuration data and copy only the subset of the set of configuration data selected by the user.

According to one embodiment of the present invention, an extractor 425 can also be communicatively coupled with the database 410 and/or second instance of the base application 410. As in the first environment 305, the extractor 425 of the second environment 405 can be adapted to identify a set of configuration data saved in the database 415, the second instance of the base application 410, or elsewhere. The set of configuration data can contain data for substantially replicating a configuration from this second instance of the base application 410. The extractor 425 can identify this configuration data in a number of different ways as discussed above and may also can provide a list or other presentation of the data to be extracted as configuration data for the user to approve or modify also as discussed above.

Once the extractor 425 identifies the set of configuration data, the extractor 425 can extract the set of configuration data and create a manifest identifying data in the set of configuration data. The extractor 425 can save the set of configuration data in a second new configuration 450 in a portable format that includes the set of configuration data 455 and the manifest 460 readable by the loader of yet another instance of the base application in another environment (not shown here).

In this way, embodiments of the present invention provide for extracting complete configurations and also allow the user to define which elements of configurations they want to include. According to one embodiment, extraction can occur from a usable instance of the application so the configuration can be tested and extracted as a whole after validation. For example, the first instance 310 can comprise a demonstration version of the base application and the second instance 410 can comprise a full version of the base application. In another example, the first instance 310 comprises a development version of the base application and the second instance 410 can comprise a production version of the base application. In yet another example, the first instance 310 and second instance 410 comprise production versions of the base application. In still another embodiment, the first instance 310 may comprise a full version of the base application and the second instance may comprise a demonstration version of the base application. Other possible combinations and implementation are also contemplated and considered to be within the scope of the present invention. Furthermore, while reference is made herein to a first environment 305 and a second environment 405, it should be understood that embodiments of the present invention are not limited to replicating configurations across environments. Rather, embodiments of the present invention are considered to be equally applicable to replicating configurations between any occurrences of the base application, regardless of whether they are implemented on the same or different physical or logical environments, systems, etc.

Figure 5:
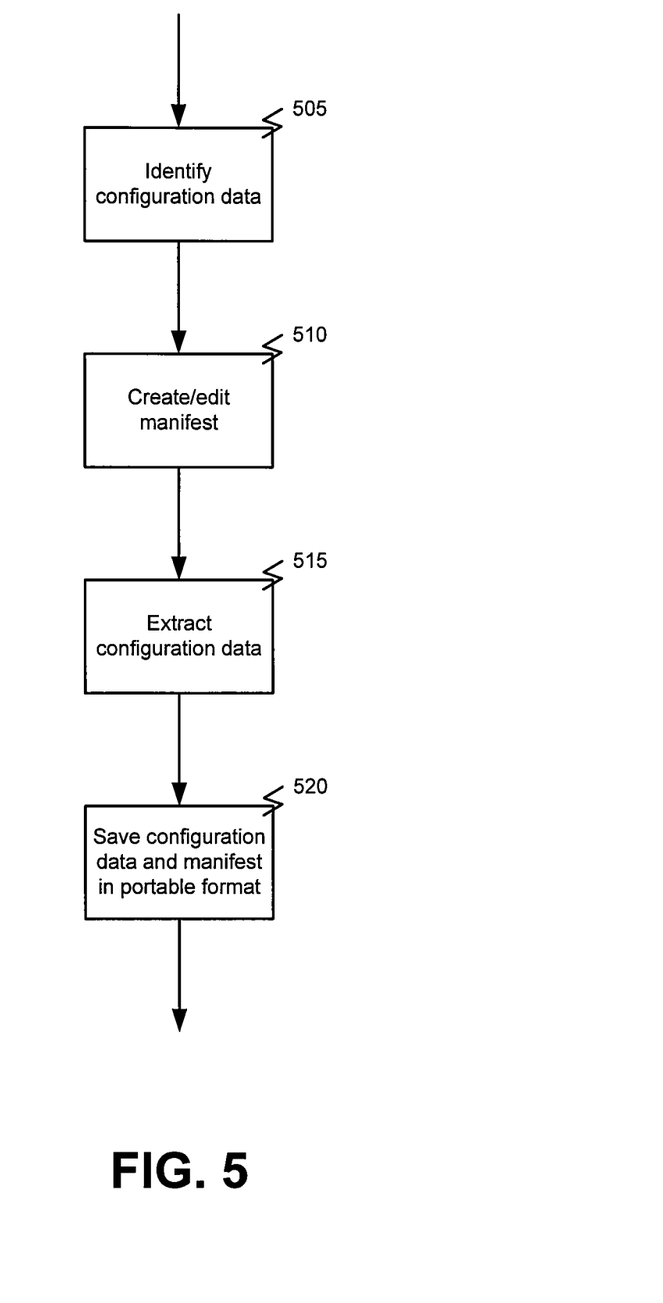
FIG. 5 is a flowchart illustrating, at a high level, a process for extracting configuration data according to one embodiment of the present invention.

FIG. 5 is a flowchart illustrating, at a high level, a process for extracting configuration data according to one embodiment of the present invention. In this example, the process begins with identifying 505 a set of configuration data used by a first instance of the application program. The set of configuration data can contain data for substantially replicating a configuration for the first instance of the application program. As noted above, identifying a set of configuration data can comprise, for example, determining whether the data comprises data predefined as configuration data or predefined as non-configuration data or by determining whether the data has changed due to configuration activities, for example, since creation or installation of the first instance of the application.

The set of identified configuration data can be extracted 510. A manifest identifying data in the set of configuration data can be created or edited 515. That is, the manifest can provide a list or other summary of the configuration data, identify the location and/or use for the data, identify whether the data should be appended to a destination or should overwrite such a destination, etc. This can be determined by the manifest. For example, the user creating the extraction can specify whether the configuration components should append or replace existing configuration at the time of loading. This definition will be for granular parts of the configuration. The system will have a default behavior.

The set of configuration data can be saved 520 in a portable format that includes the set of configuration data and the manifest. Saving the configuration data in a portable format can comprise saving the configuration data in a repository readable by the loader of a second instance of the application program and the manifest can comprise a file readable by the loader. For example, the repository can comprise a database while the manifest can comprise a set of values and attributes defining the set of configuration data in the repository. The manifest can, for example, comprise an eXtensible Markup Language (XML) file.

Figure 6:
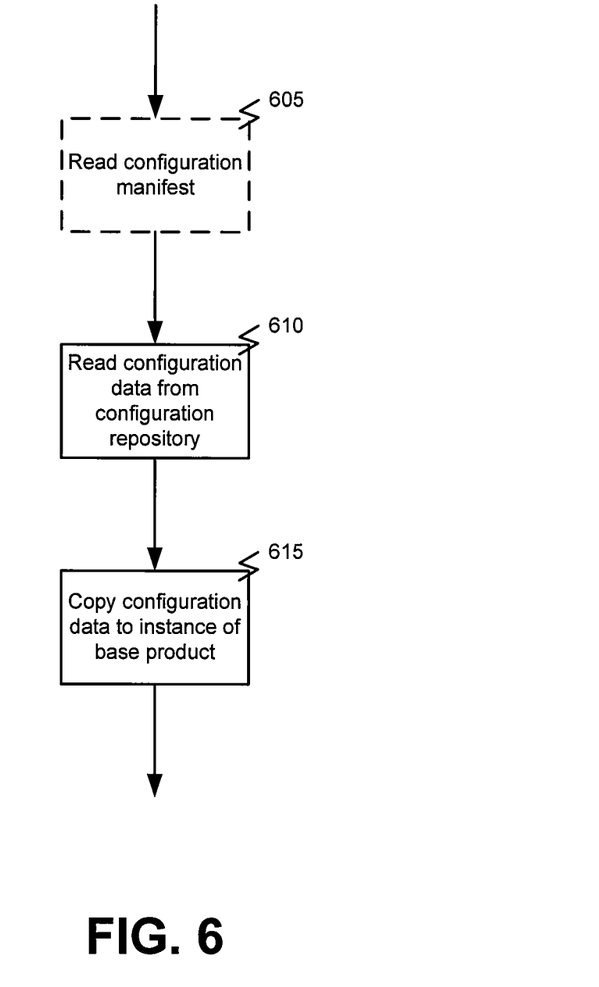
FIG. 6 is a flowchart illustrating, at a high level, a process for loading configuration data according to one embodiment of the present invention.

FIG. 6 is a flowchart illustrating, at a high level, a process for loading configuration data according to one embodiment of the present invention. In this example, the process begins with reading 605 the manifest from the portable extraction. The set of configuration data from the first instance of the application program can be read 610 from a configuration repository. The set of configuration data can then be copied 615 to a second instance of the application program, stored in a database, file, memory, or other storage used by the second instance of the application, etc. The configuration data can be copied 615 based on information in the manifest.

Figure 7:
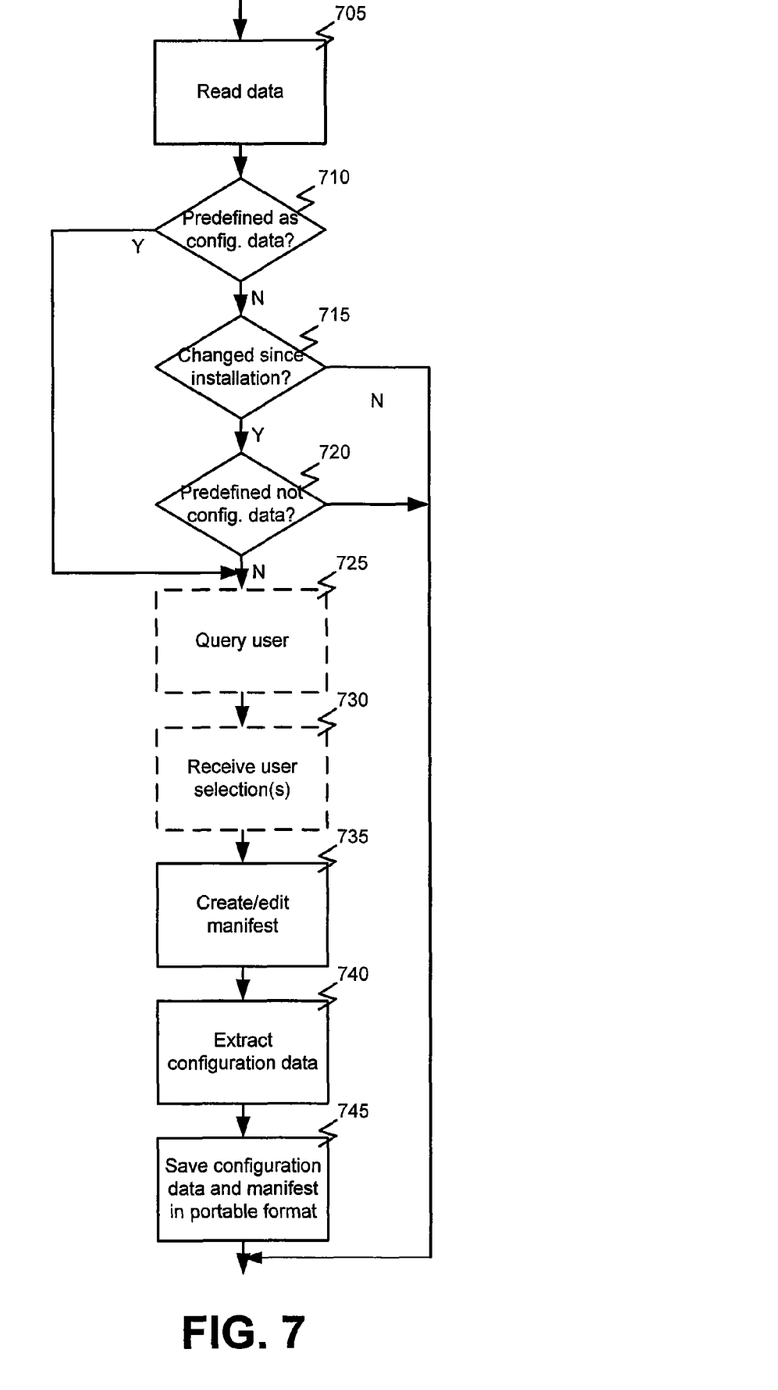
FIG. 7 is a flowchart illustrating additional details of a process for extracting configuration data according to one embodiment of the present invention.

FIG. 7 is a flowchart illustrating additional details of a process for extracting configuration data according to one embodiment of the present invention. In this example, the process begins with reading 705 data used by an instance of a base application. As discussed above, configuration data can be identified 710-720 in the data used by the base application. So, according to this embodiment, a determination 710 can be made as to whether the data comprises data predefined as configuration data. Another determination 715 can be made as to whether the data has changed due to configuration activity, for example, since creation or installation of the instance of the application, since the last extraction, etc. Yet another determination 720 can be made as to whether the data comprises data predefined as not being configuration data.

Optionally, a summary of the set of configuration data or other query can be presented 725 to a user. That is, a summary of the identified configuration data can be provided to a user for confirmation or modification and a user selection of a subset of the set of configuration data can be received 730.

A manifest identifying data in the set of configuration data can be created or edited 735. The set of identified configuration data can be extracted 740. Finally, the set of configuration data can be saved 745 in a portable format that includes the set of configuration data and the manifest. Saving 745 the configuration data in a portable format can comprise saving the configuration data in a repository readable by the loader of a second instance of the application program and the manifest can comprise a file readable by the loader. For example, the repository can comprise a database while the manifest can comprise a set of values and attributes defining the set of configuration data in the repository. The manifest can, for example, comprise an eXtensible Markup Language (XML) file. It should be noted that this process can be iterative for other data in the system. In other words, the process can be run for other tables.

Figure 8:
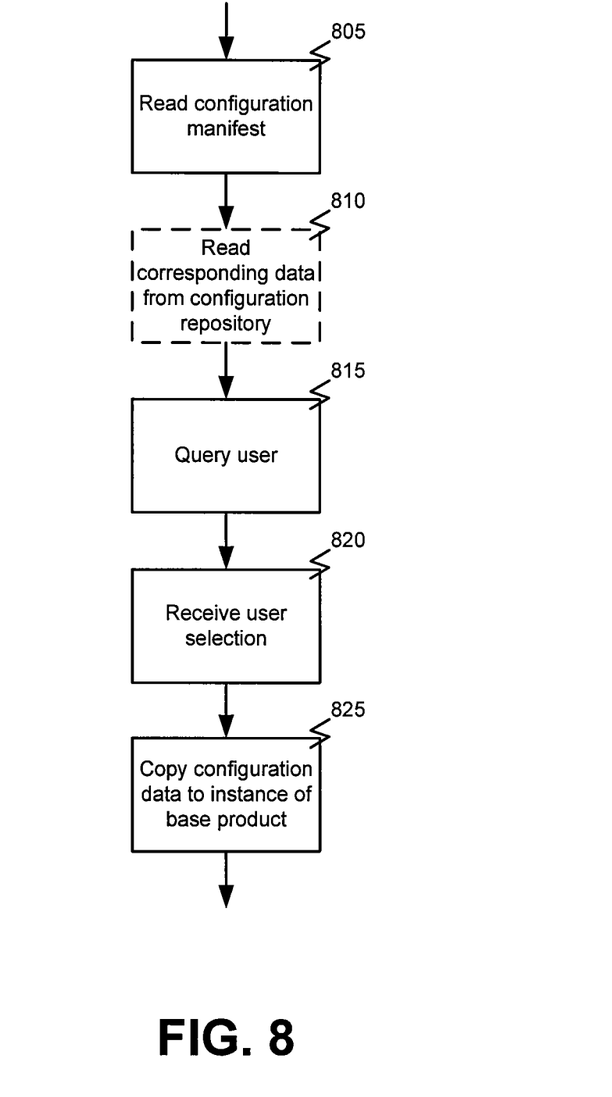
FIG. 8 is a flowchart illustrating additional details of a process for loading configuration data according to one embodiment of the present invention.

FIG. 8 is a flowchart illustrating additional details of a process for loading configuration data according to one embodiment of the present invention. In this example, the process begins with reading 805 the manifest from a portable extraction. Optionally, the set of configuration data in the extraction can be read 810.

A summary of the set of configuration data or other query can be presented 815 to a user for confirmation and/or selection. A user selection of a subset of the set of configuration data can be received 820. Finally, the set of configuration data, including or limited to the user selection, if any, can be copied 825 to a second instance of the application program based on information in the manifest.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method of automating setup of configuration data for an application program, the method comprising:
   identifying, with a computer system executing a source environment, a set of configuration data used by a first executable instance of the application program executing in the source environment, the first executable instance of the application program comprising a plurality of modules and wherein the set of configuration data contains data defining a setup of the first executable instance for execution in the source environment and for substantially replicating a configuration from the first executable instance of the application program, wherein the identifying comprises:
      reading initial data used by the first executable instance of the application program; and
      in response to determining that the initial data used by the first executable instance of the application program does not comprise data predefined as being configuration data, determining whether the initial data has changed due to configuration activity and determining whether the initial data is predefined as not being configuration data;
   extracting, with the computer system executing the source environment, a subset of configuration data, wherein:
      extracting the subset of configuration data comprises presenting a summary of the set of configuration data to a user and receiving a user selection; and
      the subset of configuration data includes only configuration data indicated by the user selection;
   creating, with the computer system executing the source environment, a manifest defining data in the subset of configuration data, wherein:
      the manifest comprises a set of values and attributes defining the subset of configuration data in a repository wherein the set of values and attributes identify:
         each datum in the subset of configuration data;
         a location for each datum in the subset of configuration data; and
         whether each datum in the subset of configuration data should overwrite or be appended to the identified location; and
      the subset of configuration data includes:
         at least one value identified by the manifest as a value that should overwrite a location identified in the manifest; and
         at least one value identified by the manifest as a value that should be appended to a location identified in the manifest; and
   saving, with the computer system executing the source environment, the subset of configuration data in a portable format package, wherein;
      the portable format package includes both the subset of configuration data and the manifest; and
      saving the subset of configuration data in the portable format comprises:
         saving the subset of configuration data in a database readable by a tool for loading the subset of configuration data into a second executable instance of the application program; and
         saving the manifest in the portable format package, but separate from the subset of configuration data and readable by the tool.

2. The method of claim 1, further comprising receiving, with the computer system executing the source environment, a user selection of additional configuration data not represented in the set of configuration data.

3. The method of claim 2, wherein extracting the subset of configuration data, creating the manifest, and saving the subset of configuration data includes the additional configuration data.

4. The method of claim 1, wherein the repository comprises a database.

5. The method of claim 1, wherein the manifest comprises an eXtensible Markup Language (XML) file.

6. The method of claim 1, wherein the application program comprises an enterprise solution.

7. The method of claim 1, further comprising:
reading, with a computer system executing a target environment, the manifest;
reading, with the computer system executing the target environment, the subset of configuration data extracted from the first executable instance of the application program; and
copying, with the computer system executing the target environment, the subset of configuration data to a second executable instance of the application program executing in the target environment to set up the second executable instance for execution in the target environment based on information in the manifest.

8. The method of claim 7, further comprising, prior to copying the subset of configuration data, presenting a summary of the subset of configuration data to a user.

9. The method of claim 8, further comprising receiving a user selection of a subset of the subset of configuration data.

10. The method of claim 9, wherein copying the subset of configuration data to the second executable instance of the application program includes only the subset of the subset of configuration data.

11. A system comprising:
a first processor; and
a first memory communicatively coupled with and readable by the first processor, the first memory having stored therein a series of instructions which, when executed by the first processor, cause the first processor to execute operations comprising:
identifying a set of configuration data used by a first executable instance of the application program executing in the source environment, the first executable instance of the application program comprising a plurality of modules and wherein the set of configuration data contains data defining a setup of the first executable instance for execution in the source environment and for substantially replicating a configuration from the first executable instance of the application program, wherein the identifying comprises:
reading initial data used by the first executable instance of the application program; and
in response to determining that the initial data used by the first executable instance of the application program does not comprise data predefined as being configuration data, determining whether the initial data has changed due to configuration activity and determining whether the initial data is predefined as not being configuration data;
extracting a subset of configuration data, wherein:
extracting the subset of configuration data comprises presenting a summary of the set of configuration data to a user and receiving a user selection; and
the subset of configuration data includes only configuration data indicated by the user selection;
creating a manifest defining data in the subset of configuration data, wherein;
the manifest comprises a set of values and attributes defining the subset of configuration data in a repository wherein the set of values and attributes identify:
each datum in the subset of configuration data;
a location for each datum in the subset of configuration data; and
whether each datum in the subset of configuration data should overwrite or be appended to the identified location; and
the subset of configuration data includes:
at least one value identified by the manifest as a value that should overwrite a location identified in the manifest; and
at least one value identified by the manifest as a value that should be appended to a location identified in the manifest; and
saving the subset of configuration data in a portable format package, wherein;
the portable format package includes both the subset of configuration data and the manifest; and
saving the subset of configuration data in the portable format comprises:
saving the subset of configuration data in a database readable by a tool for loading the subset of configuration data into a second executable instance of the application program; and
saving the manifest in the portable format package, but separate from the subset of configuration data and readable by the tool.

12. The system of claim 11, wherein the series of instructions further cause the first processor to execute additional operations comprising receiving a user selection of additional configuration data not represented in the identified configuration data within the set of configuration data.

13. The system of claim 12, wherein extracting the subset of configuration data, creating the manifest, and saving the subset of configuration data includes the additional configuration data.

14. The system of claim 11, wherein the repository comprises a database.

15. The system of claim 11, wherein the manifest comprises an eXtensible Markup Language (XML) file.

16. The system of claim 11, wherein the base application comprises an enterprise solution.

17. The system of claim 11, further comprising a second environment, the second environment comprising:
a second processor; and
a second memory communicatively coupled with and readable by the second processor, the second memory having stored therein a series of instructions which, when executed by the second processor, cause the second processor to execute a second instance of the base application and a loader communicatively coupled with the executing second instance of the base application and adapted to read the manifest, read the subset of configuration data from the executing first instance of the base application, and copy the subset of configuration data to the executing second instance of the base application to set up the second executable instance for execution based on information in the manifest.

18. The system of claim 17, wherein the loader is further adapted to present a summary of the subset of configuration data to a user prior to copying the extracted subset of configuration data.

19. The system of claim 18, wherein the loader is further adapted to receive a user selection of a subset of the subset of configuration data.

20. The system of claim 19, wherein the loader copies only the subset of the subset of configuration data selected by the user to the second instance of the base application.

21. The system of claim 17, wherein the second environment further executes an extractor communicatively coupled with the executing second instance of the base application and is adapted to identify a second subset of configuration data of the executing second instance of the base application wherein the second subset of configuration data contains data for substantially replicating a configuration from the executing second instance of the base application, extract the second subset of configuration data from the executing second instance of the base application, create a second manifest identifying data in the second subset of configuration data, and save the second subset of configuration data in a portable format, wherein the portable format includes the second subset of configuration data and the second manifest.

22. The system of claim 17, wherein the executing first instance comprises a demonstration version of the base application and the executing second instance comprises a full version of the base application.

23. The system of claim 17, wherein the executing first instance and executing second instance comprise demonstration versions of the base application.

24. The system of claim 17, wherein the executing first instance and the executing second instance comprise full versions of the base application.

25. The system of claim 17, wherein the executing first instance comprises a full version of the base application and the executing second instance comprises a demonstration version of the base application.

26. The system of claim 17, wherein the executing first instance comprises a development instance of the base application and the executing second instance comprises a production instance of the base application.

27. A non-transitory, computer-readable medium comprising instructions that, when executed by one or more processors, causes the one or more processors to perform operations comprising:
　identifying a set of configuration data used by a first executable instance of the application program executing in the source environment, the first executable instance of the application program comprising a plurality of modules and wherein the set of configuration data contains data defining a setup of the first executable instance for execution in the source environment and for substantially replicating a configuration from the first executable instance of the application program, wherein the identifying comprises:
　　reading initial data used by the first executable instance of the application program; and
　　in response to determining that the initial data used by the first executable instance of the application program does not comprise data predefined as being configuration data, determining whether the initial data has changed due to configuration activity and determining whether the initial data is predefined as not being configuration data;
　extracting a subset of configuration data, wherein:
　　extracting the subset of configuration data comprises presenting a summary of the set of configuration data to a user and receiving a user selection; and
　　the subset of configuration data includes only configuration data indicated by the user selection;
　creating a manifest defining data in the subset of configuration data, wherein:
　　the manifest comprises a set of values and attributes defining the subset of configuration data in a repository wherein the set of values and attributes identify:
　　　each datum in the subset of configuration data;
　　　a location for each datum in the subset of configuration data; and
　　　whether each datum in the subset of configuration data should overwrite or be appended to the identified location; and
　　the subset of configuration data includes:
　　　at least one value identified by the manifest as a value that should overwrite a location identified in the manifest; and
　　　at least one value identified by the manifest as a value that should be appended to a location identified in the manifest; and
　saving the subset of configuration data in a portable format package, wherein;
　　the portable format package includes both the subset of configuration data and the manifest; and
　　saving the subset of configuration data in the portable format comprises:
　　　saving the subset of configuration data in a database readable by a tool for loading the subset of configuration data into a second executable instance of the application program; and
　　　saving the manifest in the portable format package, but separate from the subset of configuration data and readable by the tool.

* * * * *

UNITED STATES PATENT AND TRADEMARK OFFICE
CERTIFICATE OF CORRECTION

| | | |
|---|---|---|
| PATENT NO. | : 9,552,214 B2 | Page 1 of 1 |
| APPLICATION NO. | : 11/380254 | |
| DATED | : January 24, 2017 | |
| INVENTOR(S) | : Stern et al. | |

It is certified that error appears in the above-identified patent and that said Letters Patent is hereby corrected as shown below:

On the Title Page

On page 2, Column 1, under Other Publications, Line 2, delete "Retreived" and insert -- Retrieved --, therefor.

On page 2, Column 1, under Other Publications, Line 6, delete "SQLLoader:" and insert -- SQL*Loader: --, therefor.

On page 2, Column 1, under Other Publications, Line 8, delete "Retrived" and insert -- Retrieved --, therefor.

On page 2, Column 1, under Other Publications, Line 10, delete "Ietup" and insert -- lsetup --, therefor.

On page 2, Column 2, under Other Publications, Line 5, delete "and and" and insert -- and --, therefor.

In the Claims

In Column 17, Line 57, in Claim 11, delete "wherein;" and insert -- wherein: --, therefor.

Signed and Sealed this
Twenty-fifth Day of July, 2017

Joseph Matal
*Performing the Functions and Duties of the*
*Under Secretary of Commerce for Intellectual Property and*
*Director of the United States Patent and Trademark Office*